United States Patent
Xia et al.

(10) Patent No.: US 8,254,939 B2
(45) Date of Patent: Aug. 28, 2012

(54) SYSTEM AND METHOD FOR MID-CALL MERGING OF MULTI-PROTOCOL CALL MESSAGES ON THE IUB AND IUR INTERFACES IN UTRAN

(75) Inventors: Qing Xia, Frisco, TX (US); Xingchen Lu, Plano, TX (US); Jun Yuan, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 1118 days.

(21) Appl. No.: 12/043,105

(22) Filed: Mar. 5, 2008

(65) Prior Publication Data

US 2008/0242262 A1    Oct. 2, 2008

Related U.S. Application Data

(60) Provisional application No. 60/909,305, filed on Mar. 30, 2007.

(51) Int. Cl.
*H04W 40/00* (2009.01)
*H04W 4/00* (2009.01)
*H04M 11/00* (2006.01)
*H04L 12/56* (2006.01)
*H04J 3/16* (2006.01)

(52) U.S. Cl. ............. 455/445; 455/405; 455/422.1; 455/428; 370/395.5; 370/466; 370/467

(58) Field of Classification Search ............ 455/403, 455/405, 422.1, 428, 445, 450; 370/310, 370/310.1, 310.2, 328, 329, 395.5, 466–469, 370/410, 496, 522; 379/32.01
See application file for complete search history.

(56) References Cited

U.S. PATENT DOCUMENTS

| | | | |
|---|---|---|---|
| 5,799,073 A * | 8/1998 | Fleischer et al. | 379/112.01 |
| 6,718,023 B1 | 4/2004 | Zolotov et al. | |
| 6,771,646 B1 * | 8/2004 | Sarkissian et al. | 370/392 |
| 7,054,325 B1 * | 5/2006 | Archibald | 370/410 |
| 2003/0162526 A1 * | 8/2003 | Ogman et al. | 455/406 |
| 2004/0248547 A1 * | 12/2004 | Philsgard et al. | 455/405 |

(Continued)

FOREIGN PATENT DOCUMENTS

EP    1 725 006 A1    11/2006

(Continued)

OTHER PUBLICATIONS

European Patent Office, European Search Report for EPO Application No. 08153358.0-1244/1976182, Nov. 15, 2010.

*Primary Examiner* — Rafael Pérez-Gutiérrez
*Assistant Examiner* — Thai Vu
(74) *Attorney, Agent, or Firm* — Michael J. Fogarty, III

(57) ABSTRACT

System and method for combining call records for different protocols into a single combined call record during a call. An embodiment comprises correlating messages having multiple protocol formats, comprising correlating messages complying with a first protocol into a first call record using a first correlation key, correlating messages complying with a second protocol into a second call record using a second correlation key, detecting a key message complying with the first protocol, the key message having a fetch key parameter associated with messages complying with the second protocol, combining data from the second call record into the first call record to create a combined call record, and creating a pointer linking the second call record to the first call record.

5 Claims, 4 Drawing Sheets

U.S. PATENT DOCUMENTS

| | | | |
|---|---|---|---|
| 2005/0094623 A1* | 5/2005 | D'Eletto | 370/352 |
| 2005/0195745 A1* | 9/2005 | Scott et al. | 370/241 |
| 2005/0198261 A1* | 9/2005 | Durvasula et al. | 709/224 |
| 2006/0039296 A1* | 2/2006 | Nakamata et al. | 370/252 |
| 2006/0092922 A1* | 5/2006 | Kobayashi et al. | 370/352 |
| 2007/0066298 A1* | 3/2007 | Hurst | 455/423 |
| 2007/0099561 A1* | 5/2007 | Voss | 455/12.1 |

FOREIGN PATENT DOCUMENTS

| | | |
|---|---|---|
| WO | WO 03/079646 A2 | 9/2003 |

* cited by examiner

| UMTS PROTOCOL STACK-IUB | | | | | |
|---|---|---|---|---|---|
| RADIO NETWORK CONTROL PLANE | TRANSPORT NETWORK CONTROL PLANE | PS DATA USER PLANE | BROADCAST DATA USER PLANE | CS DATA USER PLANE | CS VOICE USER PLANE |
| MM/SM/CC | | APPLICATION | | APPLICATION | |
| RRC | ALCAP | PDCP | BMC | TAF | AMR CODEC |
| | | | | RLP | |
| RLC | STC | RLC | | | |
| MAC | SSCF-UNI | MAC | | | |
| FP | SSCOP | FP | | | |
| AAL2 | AAL5 | AAL2 | | | |
| ATM | | | | | |

FIG. 2

| UMTS PROTOCOL STACK-IUR ||||||
|---|---|---|---|---|---|
| RADIO NETWORK CONTROL PLANE || TRANSPORT NETWORK CONTROL PLANE || PS DATA USER PLANE | CS DATA USER PLANE | CS VOICE USER PLANE |
| MM/SM/CC ||| APPLICATION | APPLICATION | |
| RRC || ALCAP | PDCP | TAF | AMR CODEC |
| SCCP || STC || RLP | |
| MTP3 B | M3UA | MTP3 B | M3UA | RLC | RLC | |
| SSCF-NN1 | SCTP | SSCF-NN1 | SCTP | MAC | MAC | |
| SSCOP | IP | SSCOP | IP | FP | FP | |
| AAL5 | AAL5 | AAL5 | AAL5 | AAL2 | AAL2 | |
| ATM ||||||

*FIG.3*

SYSTEM AND METHOD FOR MID-CALL MERGING OF MULTI-PROTOCOL CALL MESSAGES ON THE IUB AND IUR INTERFACES IN UTRAN

This application claims the benefit of U.S. Provisional Application No. 60/909,305, filed on Mar. 30, 2007, entitled System and Method for Mid-Call Merging of Multi-Protocol Call Messages on the Iub and Iur Interfaces in UTRAN, which application is hereby incorporated herein by reference.

TECHNICAL FIELD

The present invention relates generally to a system and method for monitoring messages in a wireless system, and more particularly to a system and method for capturing and correlating messages into a single call record.

BACKGROUND

The Universal Mobile Telecommunications System (UMTS) is a third-generation (3G) mobile phone technology standardized first by the European Telecommunications Standards Institute (ETSI) and now by the 3rd Generation Partnership Project (3GPP). UMTS carries both circuit switched (CS) and packet switched (PS) traffic using Wideband Code Division Multiple Access (W-CDMA) as its air interface. The description of the network components and protocols used in UMTS are well known to those of ordinary skill in the art and are available to the public from 3GPP, ETSI, and other sources. The UMTS network architecture consists of three domains: Core Network (CN), UMTS Terrestrial Radio Access Network (UTRAN), and User Equipment (UE).

The UTRAN provides the air interface access to subscribers' UE. Base stations in the UTRAN are referred as Node-Bs, and the control equipment for the Node-Bs is called a Radio Network Controller (RNC). The UMTS User Equipment communicates via the WCDMA air interface to the Node-Bs. The UE may be attached to either the PS domain or CS domain or both. The UE is capable of simultaneously using PS services and CS services.

The Asynchronous Transfer Mode (ATM) is used for data transmission in UMTS. The ATM layer multiplexes and demultiplexes and routes ATM cells, and ensures their sequence from end to end. The ATM Adaptation Layers (AAL) are responsible for the creation and reception of payloads through the lower layers of ATM on behalf of different applications. ATM Adaptation Layer type 2 (AAL2) handles circuit switched connections and packet connection protocol AAL5 is designed for data delivery.

One disadvantage of the prior art is the difficulty in identifying messages related to the same call for individual subscribers. Because multiple UEs are communicating with Node Bs and RNCs at the same time, thousands of data and control messages per second can be passed between a Node B and an RNC and between the RNCs. These messages follow several different protocol formats depending upon the purpose of the message. As a result, the messages passing on interfaces in the UTRAN do not provide sufficient information to determine which messages are related to the same subscriber.

A second disadvantage of the prior art is the difficulty in identifying related call records that are associated with different protocols. Individual call records may be established for messages of a particular protocol type. However, call records for different protocols may be related to the same call, but the call records do not comprise information that allows correlation across protocol types.

SUMMARY OF THE INVENTION

These and other problems are generally solved or circumvented, and technical advantages are generally achieved, by embodiments of the present invention in which call records are started for various protocols at the beginning of a call. Parameters from particular messages act as correlation keys to identify related protocol call records. Call records for different protocols associated with the same call are combined into one record.

In accordance with an embodiment of the present invention, a method correlates messages having multiple protocol formats. Messages complying with a first protocol are correlated into a first call record using a first correlation key, correlating messages complying with a second protocol into a second call record using a second correlation key, detecting a key message complying with the first protocol, the key message having a fetch key parameter associated with messages complying with the second protocol, combining data from the second call record into the first call record to create a combined call record, and creating a pointer linking the second call record to the first call record. After the pointer is created, subsequent messages complying with the second protocol are forwarded to the combined call record and combined into the combined call record. The messages complying with a third protocol are correlated into a third call record using a third correlation key. A second key message complying with the first protocol has a second fetch key parameter associated with messages complying with the third protocol. Data from the third call record is combined into the combined call record; and a pointer links the second call record to the combined call record. The combined call record is created during a call.

In another embodiment, a system combines with multiple protocols into call records. Monitoring equipment is coupled to interfaces at a network node. The monitoring equipment captures substantially all of the messages passing to and from the network node. A processor identifies messages complying with a first protocol and compiles the first protocol messages into a first call record. A processor identifies messages complying with a second protocol and compiles the second protocol messages into a second call record. A processor detects a key message complying with the first protocol and having a key parameter associated with messages complying with the second protocol. A processor combines data from the second call record into the first call record. The above-referenced processors may be a single processor that runs many applications or separate processors running one or more process.

The system further comprises a memory for storing the second call record, and a pointer associated with the second call record, wherein the pointer links the second call record to the first call record. The system may further comprise a processor for identifying messages complying with a third protocol and compiling the third protocol messages into a third call record, a processor for detecting a second key message complying with the first protocol and having a second fetch key parameter associated with messages complying with the third protocol, and a processor for combining data from the third call record into the first call record. The system may further comprise a memory for storing the third call record, and a pointer associated with the third call record, wherein the pointer links the third call record to the first call record.

In one embodiment, the messages complying with a first protocol are Radio Resource Control (RRC) protocol messages, the messages complying with a second protocol are Node B Application Part (NBAP) protocol messages or Access Link Control Application Part (ALCAP) protocol messages or both, and the messages complying with a third protocol are Radio Network Subsystem Application Part (RNSAP) protocol messages. The network node may be a Radio Network Controller (RNC) in a UTRAN network.

The present invention allows the monitoring equipment to correlate among multiple call records having different protocols to create a single combined call record. The present invention also allows multiple call records for different protocols to be combined into a single call record in real-time while a call is in progress.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 is a protocol stack for an Iub interface;

FIG. 3 is a protocol stack for an Iur interface;

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
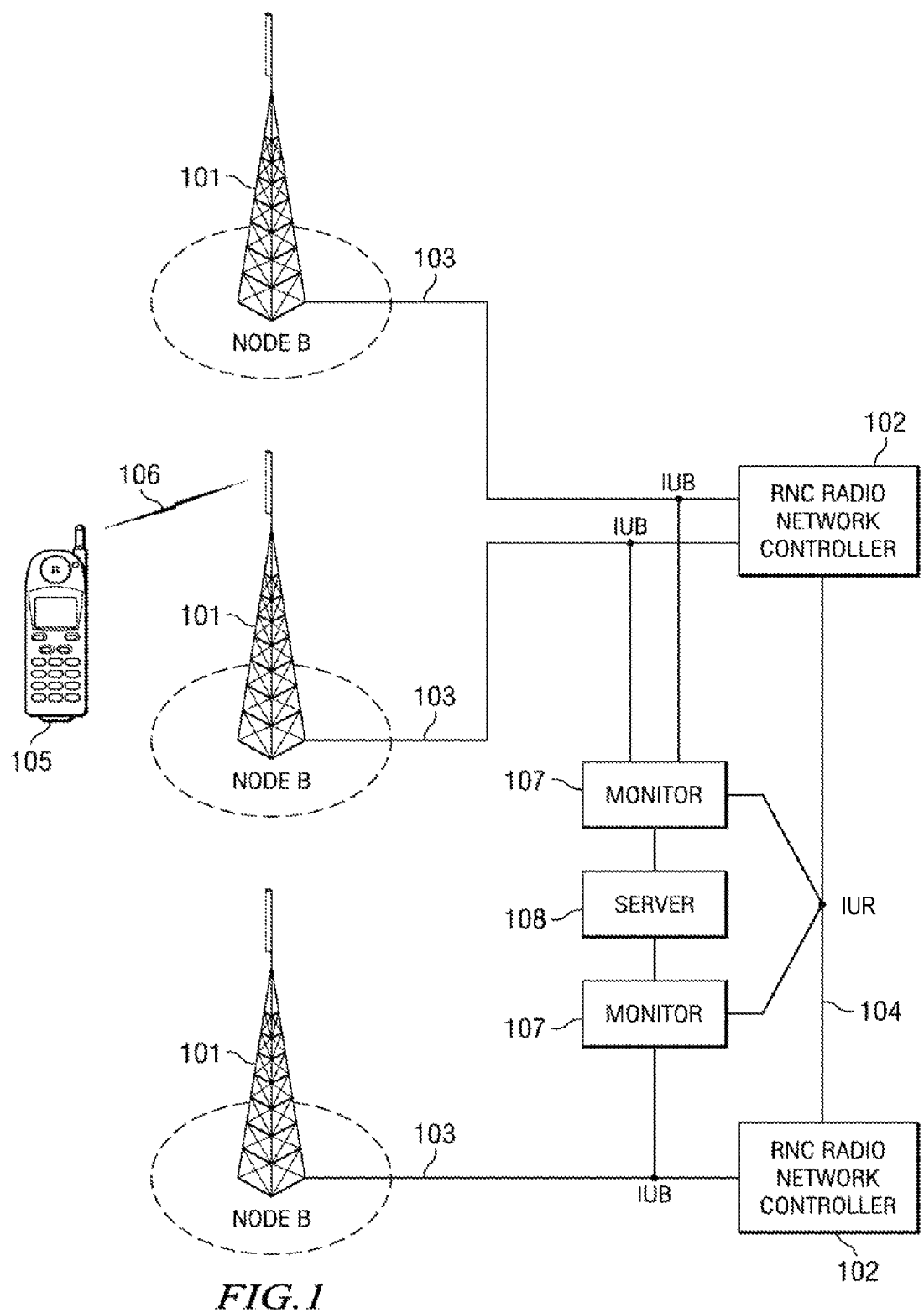
FIG. 1 illustrates monitoring equipment coupled to a UTRAN network according to embodiments of the invention.

FIG. 1 illustrates a UTRAN portion of a UMTS network comprising Node Bs 101 and Radio Network Controllers (RNCs) 102. Node Bs 101 communicate with RNCs 102 via Iub interfaces 103. RNCs 102 communicate with each other via Iur interface 104. Node B 101 is in communication with User Equipment (UE) 105 via air interface Uu 106. Whenever UEs 105 make or receive a call, signaling messages are exchanged between Node Bs 101 and RNCs 102 over Iub interfaces 103 and between RNCs 102 over Iur interfaces 104. Monitors or probes 107 are non-intrusively coupled to RNCs 102 to capture substantially all of the protocol messages traveling to and from RNCs 102 over the Iub and Iur interfaces 103 and 104. Monitors 107 are coupled to central server 108 which allows an operator to access network information collected by monitors 107.

FIG. 2 illustrates the protocol stack used on the Iub interface in a UTRAN network. FIG. 3 illustrates the protocol stack used on the Iur interface in a UTRAN network. UTRAN implements an ATM infrastructure for the Iub and Iur interfaces. UTRAN uses both AAL2 and AAL5 adaptations on top of the ATM layer. Node B Application Part (NBAP), Access Link Control Application Part (ALCAP) and Radio Network Subsystem Application Part (RNSAP) protocol messages are carried over AAL5 channels, and (Radio Resource Control) RRC protocol messages are carried over AAL2 channels.

Due to the involvement of many protocol layers used in the UTRAN, as illustrated in FIGS. 2 and 3, it is challenging to correlate all subscriber-related procedures and messages, such as RRC connection request messages, paging messages, or radio link deletion messages, across all UTRAN interface into a single call record. Monitors 107 use correlation keys to identified associated messages. Each protocol has its own correlation key.

On the Iub interface (FIG. 2), the NBAP and ALCAP protocols use AAL5 as the transport layer. For these protocols, monitors 107 use a correlation key based on the uplink scrambling code. This key ensures that all AAL5 messages belonging to a single UE are correlated to a single NBAP/ALCAP call record. On the other hand, the RRC protocol uses AAL2 as the transport layer, so a different key is used to correlate RRC messages, such as Random Access Channel (RACH), Forward Access Channel (FACH), and Dedicated Channel (DCH) messages, into RRC call records. On the Iur interface (FIG. 3), the RNSAP protocol uses MTP3B/SCCP as the transport layer. The correlation key used to combine the RNSAP messages in to an RNSAP call record is different from the key used for the NBAP/ALCAP and RRC call records.

As monitors 107 capture messages exchanged across the Iub and Iur interfaces, they begin to build call records by combining related messages. For example, as a monitor detects NBAP and ALCAP messages having the same uplink scrambling code, those messages will be correlated into a single NBAP/ALCAP call record. Similarly, as the monitor detects RRC messages that match a common correlation key, those RRC protocol messages will be combined into a single RRC call record. Likewise, RNSAP messages matching a RNSAP correlation key will be combined into a single call record. As a result, as monitors 107 begin to capture messages from RNCs 102 and links 103 and 104, several call records will be opened for a single call. The present invention uses a "fetch and bridge" method to merge the separate protocol call records into a single combined call record. The protocol call records are combined while the call is in progress, or "mid-call."

Mid-call merging uses the "fetch and bridge" method to get the protocol call records merged into a single combined call record. The "fetch" action occurs when the RRC call record pulls in data from a related NBAP/ALCAP call record. The "bridge" action occurs for the subsequent NBAP/ALCAP protocol messages for that call, which carry a different correlation key than RRC messages, but need to be transferred into the same RRC call record as related NBAP/ALCAP messages.

Figure 4:
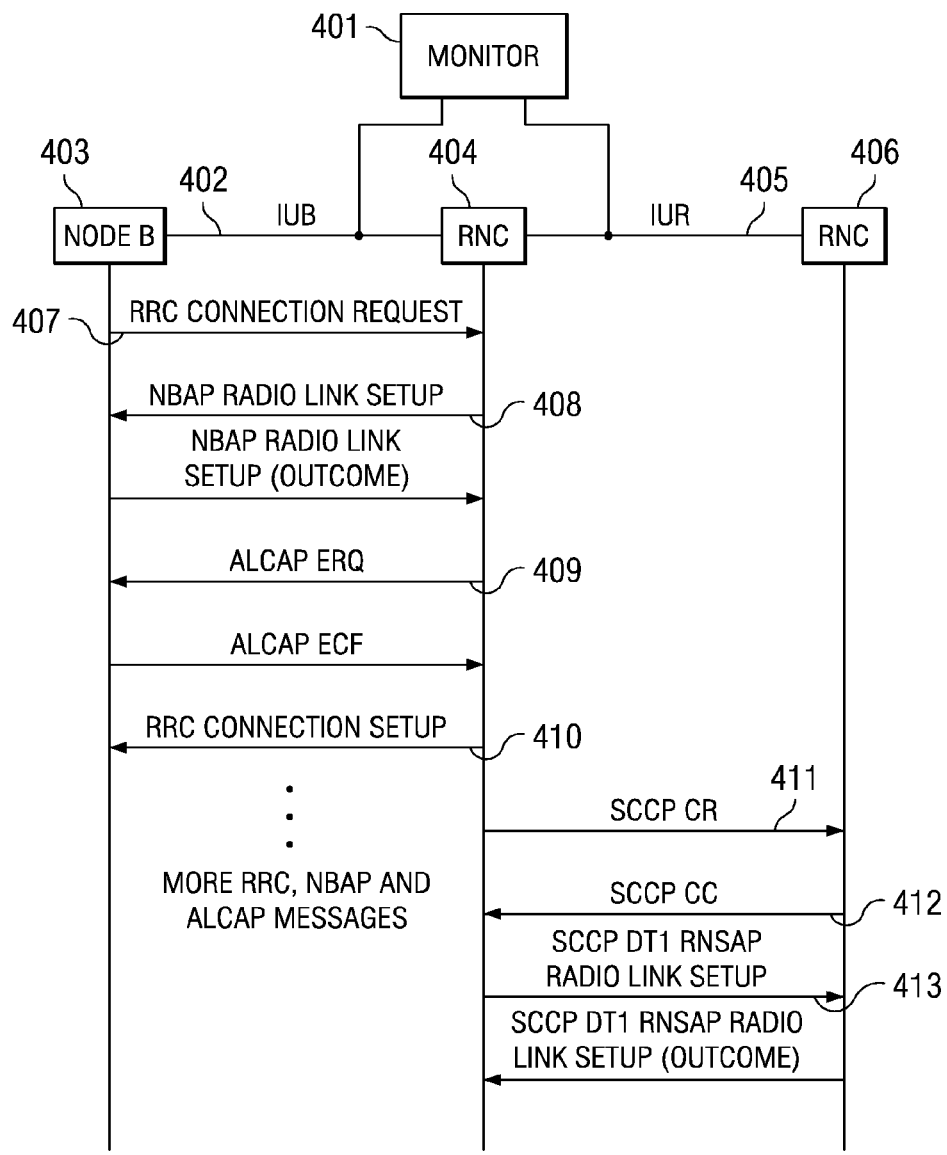
FIG. 4 illustrates messages captured from the Iub and Iur interfaces by monitoring equipment according to embodiments of the invention.
Figure 5:
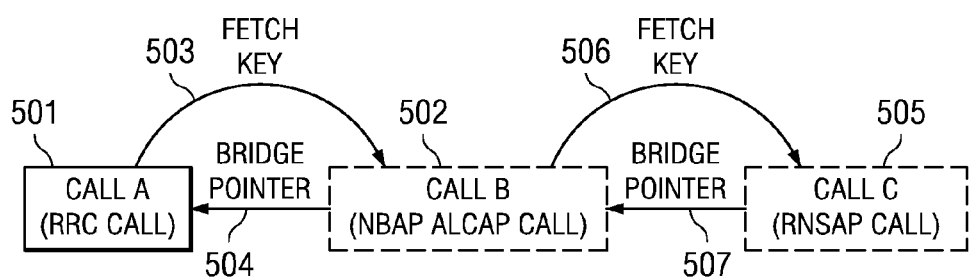
FIG. 5 is a block diagram illustrating the relationship between call records according to embodiments of the invention.

FIG. 4 illustrates the Iub and Iur message flow for a mobile-originated call with inter-RNC handover. Monitor 401 captures protocol messages from Iub interface 402 between Node B 403 and RNC 404 and from Iur interface 405 between RNC 404 and 406. Upon receiving RRC ConnectionRequest message 407, monitor 401 creates an RRC call record, such as Call A (501, FIG. 5), using RRC correlation key A. Upon receiving NBAP RadioLinkSetup message 408, monitor 401 creates a NBAP/ALCAP call record, such as Call B (502, FIG. 5), using correlation key B. As monitor 401 captures ALCAP messages, such as message 409, having the same uplink scrambling code as correlation key B, those messages are correlated into Call B (502).

When monitor 401 receives RRC ConnectionSetup message 410, it will correlate the message into Call A (501). Monitor 401 also extracts the uplink scrambling code from message 410. If the extraction is successful, the uplink scrambling code is used to build a "fetch key" (503) to identify and fetch the related Call B record (502). If the fetch is successful, a "bridge" pointer (504) is setup between Call B record 502 and Call A record 501. Subsequently captured RRC messages with correlation key A will still be correlated into Call A (501). When monitor 401 detects subsequent NBAP/ALCAP messages having correlation key B, the messages will first be correlated into Call B record 502. Then, utilizing bridge pointer 504 between Call B record 502 and Call A record 501, the NBAP/ALCAP messages will be transferred into Call A record 501. Accordingly, after the fetch operation, Call B record 502 is just a bridge to facilitate call record merging. Once all the messages related to this UE's call have been processed, Call B record 502 will be destroyed.

The same logic is applied to correlating Iub-Iur messages during inter-RNC handover scenarios. RNSAP Call C record 505 using correlation key C is created by monitor 401 upon receiving SCCP CR and SCCP CC messages 411 and 412. When message 413 having RNSAP on top of SCCP DT1 is received by monitor 401, the uplink scrambling code is extracted from message 413 to build 506 (FIG. 5) fetch key, which is used to find existing related Call B record 502. Bridge pointer 507 is established to combine messages from Call C record 505 into Call B record 502, which are eventually merged into the Call A record 501. Once fetch 506 occurs and bridge pointer 507 is set up, Call C record 505 is just a bridge to facilitate call record merging and will be destroyed once the bridge is no longer needed at the end of the call.

As discussed above, the merging process begins upon receipt of RRC ConnectionSetup message 410. This message occurs in the middle of the call, so this process is referred to as mid-call merging. The RRC ConnectionSetup message is used because it may carry the uplink scrambling code, which is key to linking the RRC and NBAP/ALCAP call records together.

The present invention provides the real-time call tracking for a UTRAN monitoring system. All of the messages on the Iub and Iur interfaces belong to one UE are continuously tracked and correlated into a single call record. Instead of keeping the messages in separate call records without mid-call merging, the invention achieves multi-protocol correlation in real time. This provides improved real-time call tracking for which the end user needs to select one call record to get all of the details belong to a selected UE.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    correlating Radio Resource Control (RRC) protocol messages obtained from an Iub interface during a call into a first call record, the RRC protocol messages selected using a first correlation key;
    correlating Node B Application Part (NBAP)/Access Link Control Application Part (ALCAP) protocol messages obtained from the Iub interface during the call into a second call record, the NBAP/ALCAP protocol messages selected using a second correlation key;
    creating a first fetch key based upon an uplink scrambling code extracted from an RRC connection setup message among the RRC protocol messages;
    merging the NBAP/ALCAP protocol messages into the first call record based, at least in part, upon the first fetch key;
    creating a first pointer linking the second call record to the first call record;
    correlating another NBAP/ALCAP protocol message obtained from the Iub interface during the call into the second call record, the other NBAP/ALCAP protocol message selected using the second correlation key;
    merging the other NBAP/ALCAP protocol message into the first call record based, at least in part, upon the first pointer;
    correlating Radio Network Subsystem Application Part (RNSAP) protocol messages obtained from an Iur interface into a third call record, the RNSAP protocol messages selected using a third correlation key;
    creating a second fetch key based upon an uplink scrambling code extracted from a RNSAP radio link setup message among the RNSAP protocol messages;
    merging the RNSAP protocol messages into the second call record based, at least in part, upon the second fetch key;
    creating a second pointer linking the third call record to the second call record;
    correlating another RNSAP protocol message obtained from the Iur interface during the call into the third call record, the other RNSAP protocol message selected using the third correlation key; and
    merging the other RNSAP protocol message into the second call record based, at least in part, upon the second pointer.

2. The method of claim 1, further comprising merging the other RNSAP protocol message from the second call record into the first call record based, at least in part, upon the first pointer.

3. A method, comprising:
    correlating Radio Resource Control (RRC) protocol messages obtained from an Iub interface during a call into a first call record, the RRC protocol messages selected using a first correlation key;
    correlating Node B Application Part (NBAP)/Access Link Control Application Part (ALCAP) protocol messages obtained from the Iub interface during the call into a second call record, the NBAP/ALCAP protocol messages selected using a second correlation key;
    creating a first fetch key based upon an uplink scrambling code extracted from an RRC connection setup message among the RRC protocol messages;
    merging the NBAP/ALCAP protocol messages into the first call record based, at least in part, upon the first fetch key;
    creating a first pointer linking the second call record to the combined call record;
    correlating another NBAP/ALCAP protocol message obtained from the Iub interface during the call into the second call record, the other NBAP/ALCAP protocol message selected using the second correlation key;
    merging the other NBAP/ALCAP protocol message into the first call record based, at least in part, upon the first pointer;
    correlating Radio Network Subsystem Application Part (RNSAP) protocol messages obtained from an Iur interface into a third call record, the RNSAP protocol messages selected using a third correlation key;

creating a second fetch key based upon an uplink scrambling code extracted from a RNSAP radio link setup message among the RNSAP protocol messages;

merging the RNSAP protocol messages into the second call record based, at least in part, upon the second fetch key;

creating a second pointer linking the third call record to the second call record;

correlating another RNSAP protocol message obtained from the Iur interface during the call into the third call record, the other RNSAP protocol message selected using the third correlation key;

merging the other RNSAP protocol message into the second call record based, at least in part, upon the second pointer; and merging the other RNSAP protocol message from the second call record into the first call record based, at least in part, upon the first pointer.

4. A system, comprising:

monitoring equipment coupled to interfaces at a network node, the monitoring equipment configured to capture substantially all the messages passing to and from the network node; and a processor coupled to the monitoring equipment, the processor configured to:

correlate Radio Resource Control (RRC) protocol messages obtained from an Iub interface during a call into a first call record, the RRC protocol messages selected using a first correlation key;

correlate Node B Application Part (NBAP)/Access Link Control Application Part (ALCAP) protocol messages obtained from the Iub interface during the call into a second call record, the NBAP/ALCAP protocol messages selected using a second correlation key;

create a first fetch key based upon an uplink scrambling code extracted from an RRC connection setup message among the RRC protocol messages;

merge the NBAP/ALCAP protocol messages into the first call record based, at least in part, upon the first fetch key;

create a first pointer linking the second call record to the first call record;

correlate another NBAP/ALCAP protocol message obtained from the Iub interface during the call into the second call record, the other NBAP/ALCAP protocol message selected using the second correlation key;

merge the other NBAP/ALCAP protocol message into the first call record based, at least in part, upon the first pointer;

correlate Radio Network Subsystem Application Part (RNSAP) protocol messages obtained from an Iur interface into a third call record, the RNSAP protocol messages selected using a third correlation key;

create a second fetch key based upon an uplink scrambling code extracted from a RNSAP radio link setup message among the RNSAP protocol messages;

merge the RNSAP protocol messages into the second call record based, at least in part, upon the second fetch key;

create a second pointer linking the third call record to the second call record;

correlate another RNSAP protocol message obtained from the Iur interface during the call into the third call record, the other RNSAP protocol message selected using the third correlation key; and merge the other RNSAP protocol message into the second call record based, at least in part, upon the second pointer.

5. The system of claim 4, the processor further configured to:

merge the other RNSAP protocol message from the second call record into the first call record based, at least in part, upon the first pointer.

* * * * *